United States Patent
Okuyama

(10) Patent No.: US 9,556,357 B2
(45) Date of Patent: Jan. 31, 2017

(54) INK COMPOSITION, INK SET, AND BLACK INK SET

(71) Applicant: Seiko Epson Corporation, Tokyo (JP)

(72) Inventor: Tomoyuki Okuyama, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/624,957

(22) Filed: Feb. 18, 2015

(65) Prior Publication Data

US 2015/0232694 A1   Aug. 20, 2015

(30) Foreign Application Priority Data

Feb. 20, 2014   (JP) ................. 2014-030361

(51) Int. Cl.
| | | |
|---|---|---|
| C09D 175/04 | (2006.01) | |
| C09D 11/40 | (2014.01) | |
| C09D 11/324 | (2014.01) | |
| C09D 11/38 | (2014.01) | |

(52) U.S. Cl.
CPC ........... *C09D 175/04* (2013.01); *C09D 11/324* (2013.01); *C09D 11/38* (2013.01); *C09D 11/40* (2013.01)

(58) Field of Classification Search
None
See application file for complete search history.

(56) References Cited

U.S. PATENT DOCUMENTS

| | | | |
|---|---|---|---|
| 2002/0075348 A1* | 6/2002 | Shindo | B41J 2/16508 347/29 |
| 2009/0201352 A1* | 8/2009 | Sakurai | B41J 2/19 347/92 |
| 2010/0285221 A1* | 11/2010 | Oki | C09D 11/326 427/256 |
| 2011/0048278 A1* | 3/2011 | Kiyomoto | C09D 11/322 106/31.86 |

FOREIGN PATENT DOCUMENTS

JP   2006-021451 A   1/2006

\* cited by examiner

*Primary Examiner* — An Do
*Assistant Examiner* — Renee I Wilson
(74) *Attorney, Agent, or Firm* — Harness, Dickey & Pierce, P.L.C.

(57) ABSTRACT

Disclosed herein is an ink composition, including: a pigment; acetylenediol having an HLB of less than 4; and an anionic surfactant, in which the mass ratio of the acetylene diol to the anionic surfactant is 0.30 to 4.0.

14 Claims, 1 Drawing Sheet

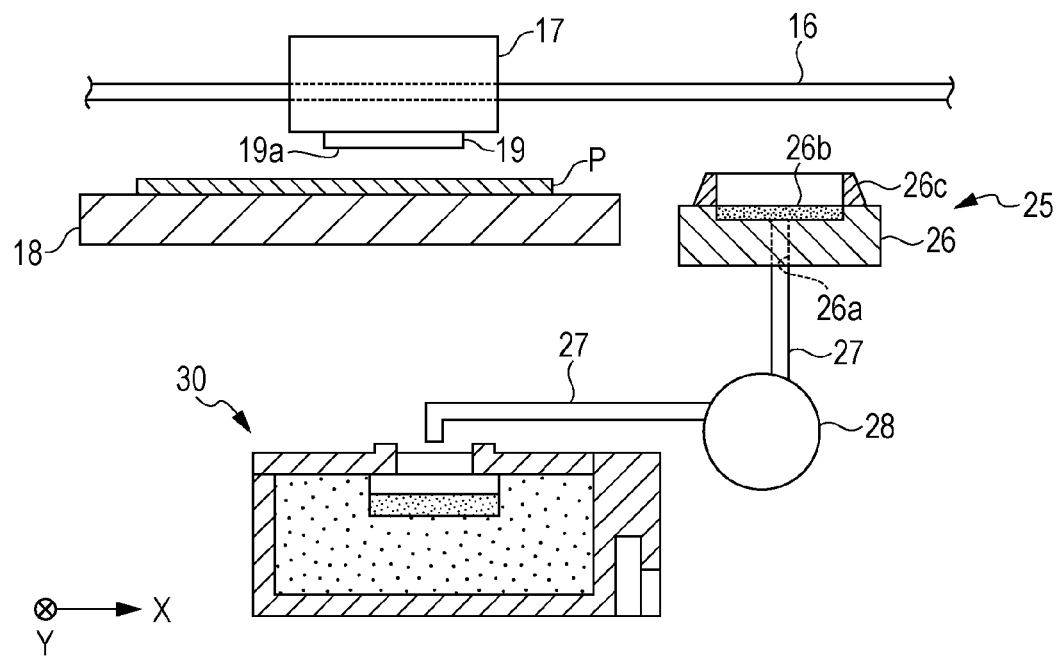

INK COMPOSITION, INK SET, AND BLACK INK SET

BACKGROUND

1. Technical Field

The present invention relates to an ink composition, an ink set, and a black ink set.

2. Related Art

As a liquid ejecting apparatus for ejecting liquid onto a target, an ink jet printer for ejecting ink onto a recording medium (hereinafter, simply referred to as a printer) is known. In this printer, in order to reduce the ejection failure of ink, cleaning for discharging the ink or the like thickened from an injection nozzle for ejecting ink has been appropriately carried out.

In this cleaning, a nozzle formation surface provided with nozzles is sealed with a suction cap, and then a space (in the suction cap) hermetically closed with the nozzle formation surface and the suction cap is vacuumed up by a suction pump. That is, in the cleaning, a space having negative pressure is formed in the discharge direction of ink, and the thickened ink or like is discharged from a nozzle by using the negative pressure.

In such cleaning, generally, the ink discharged from the nozzle is sucked by the suction pump through the suction cap, and is then discharged to an ink recovery unit as a liquid recovery unit. In such an ink recovery unit, an ink absorber for absorbing ink is contained. This ink absorber absorbs the discharged ink, thereby recovering the ink discharged from the suction pump.

As an example of the technology focusing on an ink recovery unit, JP-A-2006-21451 is known. JP-A-2006-21451, for the purpose of providing a liquid absorber for eliminating the bubbles contained in the liquid discharged from an outlet of a suction pump to a liquid recovery unit and smoothly absorbing and recovering the discharged liquid, discloses a liquid absorber for absorbing the liquid discharged from an outlet of a suction means depressurizing the space by suctioning liquid and gas, in which the liquid absorber includes a defoaming agent for eliminating the bubbles contained in the liquid discharged from the outlet.

However, in the technique described in JPA-2006-21451, there is a problem that a mechanism for supplying a defoaming agent to the liquid absorber of the liquid recovery unit in a recording apparatus is further required.

Further, the ink sucked through the nozzle contains the bubbles generated therein by the suction (negative pressure). Through the suction cap, fine bubbles are discharged together with the thickened ink. Since it is difficult for these bubbles to be absorbed by the ink absorber in the suction cap, an ink composition accumulates in the suction cap, and eventually the ink composition overflows from the suction cap. When the ink composition overflows from the suction cap, there is a concern that the nozzle formation surface is contaminated during the cleaning, and thus cleaning-induced ejection failure occurs.

SUMMARY

An advantage of some aspects of the invention is to provide an ink composition, an ink set, and a black ink set, each of which can suppress cleaning-induced ejection failure and is excellent in intermittent characteristics.

The present inventors have conducted intensive studies. As a result, they have found that the invention can be realized by using a predetermined acetylenediol and an anionic surfactant, thus completing the invention.

That is, the invention is as follows.

[1] According to an aspect of the invention, there is provided an ink composition, including: a pigment; acetylenediol having an HLB of less than 4; and an anionic surfactant, in which the mass ratio of the acetylenediol to the anionic surfactant is 0.30 to 4.0.

[2] The ink composition according to the above [1] may further include 1,2-alkanediol having 4 to 6 carbon atoms, in which the mass ratio of the acetylenediol to the 1,2-alkanediol may be 0.0010 to 0.100.

[3] In the ink composition according to the above [1] or [2], the acetylenediol may include 2,5,8,11-tetramethyl-6-dodecyne-5,8-diol.

[4] In the ink composition according to any one of the above [1] to [3], the content of the anionic surfactant may be 0.025 mass % to 0.25 mass %.

[5] In the ink composition according to any one of the above [1] to [4], the content of the acetylenediol may be 0.010 mass % to 0.40 mass %.

[6] In the ink composition according to any one of the above [1] to [5], the anionic surfactant may contain at least one selected from the group consisting of polyoxyethylene-based compounds and sulfates.

[7] In the ink composition according to any one of the above [1] to [6], the content of the pigment may be equal to or greater than 5.0 mass %.

[8] The ink composition according to any one of the above [1] to [7] may be used in a recording apparatus having a suction cap.

[9] The ink composition according to any one of the above [1] to [8] may further include an acetylenediol derivative having an HLB of equal to or greater than 7.

[10] The ink composition according to any one of the above [1] to [9] may further include a pyrrolidone derivative.

[11] The ink composition according to any one of the above [1] to [10] may have a dissolved nitrogen content of equal to or greater than 10 ppm.

[12] In the ink composition according to any one of the above [1] to [11], the pigment may contain self-dispersing carbon black.

[13] According to another aspect of the invention, there is provided an ink set, including: a self-dispersing black ink, which is the ink composition according to the above [12]; and a color ink.

[14] According to still another aspect of the invention, there is provided a black ink set, including: a self-dispersing black ink, which is the ink composition according to the above [12]; and a resin-dispersing black ink containing resin-dispersing carbon black and acetylenediol having an HLB of less than 4, in which the content of the acetylenediol contained in the resin-dispersing black ink is lower than the content of the acetylenediol contained in the self-dispersing black ink, and in which the content of the resin-dispersing carbon black is equal to or less than 3.0 mass %.

[15] According to still another aspect of the invention, there is provided a recording apparatus, including the ink composition according to any one of the above [1] to [12], the ink set according to the above [13], or the black ink set according to the above [14].

BRIEF DESCRIPTION OF THE DRAWING

The invention will be described with reference to the accompanying drawing, wherein like numbers reference like elements.

FIGURE is a schematic view of a suction cap provided in a recording apparatus.

DESCRIPTION OF EXEMPLARY EMBODIMENTS

Hereinafter, an embodiment of the invention (hereinafter, referred to as "present embodiment") will be described in detail with reference to the drawing as necessary, but the invention is not limited thereto. Various modifications can be made within the scope not departing from the gist thereof. In the drawing, the same elements are given the same reference numerals and the description thereof will not be repeated. In addition, the positional relationships such as top, bottom, left, and right are based on the positional relationships shown in the drawing unless otherwise specified. Furthermore, the ratios of the dimensions are not limited to the ratios shown in the drawings.

Ink Composition

The ink composition according to the present embodiment includes: a pigment; acetylenediol having an HLB of less than 4; and an anionic surfactant, in which the mass ratio of the acetylenediol to the anionic surfactant is 0.30 to 4.0.

Pigment

Carbon black used in a black ink is not particularly limited, but examples thereof include No. 2300, No. 900, MCF88, No. 33, No. 40, No. 45, No. 52, MA7, MA8, MA100, No. 2200B, and the like (all are manufactured by Mitsubishi Chemical Corporation); Raven 5750, Raven 5250, Raven 5000, Raven 3500, Raven 1255, Raven 700, and the like (all are manufactured by Carbon Columbia Co., Ltd.); Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (all are manufactured by CABOT JAPAN K.K.); and Color Black FW1, Color Black FW2, Color Black FW2V, Color Black FW18, Color Black FW200, Color Black 5150, Color Black 5160, Color Black S170, Printex 35, Printex U, Printex V, Printex 140U, Special Black 6, Special Black 5, Special Black 4A, Special Black 4, and the like (all are manufactured by Degussa Co., Ltd.).

The pigment used in a black ink is not particularly limited, but specific examples thereof include self-dispersing carbon black and resin-dispersing carbon black. Among these, self-dispersing carbon black is preferable. Since the self-dispersing carbon black tends to easily contain nitrogen, increase the dissolved nitrogen content of the ink composition and easily generates bubbles, the invention is particularly advantageous.

The pigment used in a white ink is not particularly limited, but examples thereof include C.I. Pigment Whites 6, 18, and 21, titanium oxide, zinc oxide, zinc sulfide, antimony oxide, zirconium oxide, white hollow resin particles, and polymer particles.

The pigment used in a yellow ink is not particularly limited, but examples thereof include C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

The pigment used in a magenta ink is not particularly limited, but examples thereof include C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:5, 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violets 19, 23, 32, 33, 36, 38, 43, and 50.

The pigment used in a cyan ink is not particularly limited, but examples thereof include C.I. Pigment Blues 1, 2, 3, 15, 15:1, 15:2, 15:3, 15:34, 15:4, 16, 18, 22, 25, 60, 65, and 66; and C. I. Bat Blues 4 and 60.

Other pigments except for the above-mentioned pigments are not particularly limited, but examples thereof include C.I. Pigment Greens 7 and 10; C.I. Pigment Browns 3, 5, 25, and 26; and C.I. Pigment Oranges 1, 2, 5, 7, 13, 14, 15, 16, 24, 34, 36, 38, 40, 43, and 63.

Pigments may be used alone or in a combination of two or more thereof.

The above-mentioned pigment may be a dispersible pigment. Examples of methods of dispersing the pigment include a method of dispersing the pigment using a water-soluble resin, a method of dispersing the pigment using a surfactant, and a method of dispersing the pigment by chemically and physically providing a hydrophilic functional group to the surface of a pigment particle to enable the pigment particles to be dispersed and/or dissolved. In the pigment used in the present embodiment, any one of the above-mentioned methods may be used, and, if necessary, a combination thereof may also be used. Particularly, in the method of dispersing the pigment in an aqueous ink composition using a water-soluble resin, when aqueous ink recorded matter adheres to a recording medium, the adhesion between the recording medium and the aqueous ink composition and/or the adhesion between solidified products in the aqueous ink composition can be increased, and therefore, this method is preferable. In addition, the method of dispersing the pigment in an aqueous ink composition by chemically and physically providing a hydrophilic functional group to the surface of a pigment particle is preferred in terms of improving the dispersion stability of the pigment and making the preservation stability of this aqueous ink composition better.

The content of the pigment is preferably 5.0 mass % to 10 mass %, more preferably 5.0 mass % to 9.0 mass %, and still more preferably 5.0 mass % to 8.0 mass %, based on the total amount of the ink composition. When the content of the pigment is equal to or greater than 5.0 mass %, there is a tendency to further improve an OD value. In addition, when the content of the pigment is equal to or less than 10 mass %, there is a tendency to further improve discharge stability and setting reliability.

Acetylenediol Having HLB of Less than 4

When the ink composition according to the present embodiment includes acetylenediol having an HLB of less than 4, the defoamability of the ink composition is further improved, thereby suppressing the cleaning-induced ejection failure thereof. In the invention, HLB is defined by the following Equation through the Griffin method. The lower limit of HLB is not particularly limited, but equal to or greater than 0 is preferable.

$$\text{HLB value} = 20 \times \text{sum of formula weight of hydrophilic portion/molecular weight}$$

The acetylenediol having an HLB of less than 4 is not particularly limited, but an example thereof includes 2,5,8,11-tetramethyl-6-dodecyne-5,8-diol. When this acetylenediol having an HLB of less than 4 is used, there is a tendency to further improve the defoamability of the ink composition, thereby suppressing the cleaning-induced ejection failure thereof. The acetylenediol having an HLB of less than 4 may be used alone or in a combination of two or more. The ink composition according to the present embodiment does not include 2,4,7,9-tetramethyl-5-decyne-4,7-diol having an HLB equal to or greater than 4 (commercially available product: Surfynol 104) or the like.

The content of the acetylenediol having an HLB of less than 4 is preferably 0.010 mass % to 0.40 mass %, more preferably 0.012 mass % to 0.30 mass %, and still more preferably 0.014 mass % to 0.20 mass %, based on the total amount of the ink composition. When the content of the acetylenediol having an HLB of less than 4 is equal to or greater than 0.01 mass %, there is a tendency to further suppress cleaning-induced ejection failure. In addition, when the content of the acetylenediol having an HLB of less than 4 is equal to or less than 0.40 mass %, there is a tendency to further improve intermittent characteristics.

Acetylenediol Derivative Having HLB of 7 or More

It is preferable that the ink composition according to the present embodiment include an acetylenediol derivative having an HLB of 7 or more. When the ink composition includes an acetylenediol derivative having an HLB of 7 or more, there is a tendency to further improve discharge stability. The acetylenediol derivative having an HLB of 7 or more is not particularly limited, but examples thereof include an alkylene oxide adduct of 2,4,7,9-tetramethyl-5-decyne-4,7-diol, an alkylene oxide adduct of 2,5,8,11-tetramethyl-6-decyne-5,8-diol, 2,4-dimethyl-5-decyne-4-ol, and an alkylene oxide adduct of 2,4-dimethyl-5-decyne-4-ol. Commercially available products of the acetylenediol derivative having a HLB of 7 or more are not particularly limited, but examples thereof include Olfine E1010 and Surfynol 465.

The content of the acetylenediol derivative having an HLB of 7 or more is preferably 0.10 mass % to 1.5 mass %, more preferably 0.15 mass % to 1.0 mass %, and still more preferably 0.25 mass % to 0.75 mass %, based on the total amount of the ink composition. When the content of the acetylenediol derivative having an HLB of 7 or more is equal to or greater than 0.10 mass %, there is a tendency to further improve discharge stability. In addition, when the content of the acetylenediol derivative having an HLB of 7 or more is equal to or less than 1.5 mass %, there is a tendency to further improve setting reliability.

From the viewpoint of improvement of solubility of the acetylenediol having an HLB of less than 4, preferably, the content of the acetylenediol derivative having an HLB of equal to or greater than 7 exceeds the content of the acetylenediol having an HLB of less than 4, and more preferably, the content of the acetylenediol derivative having an HLB of equal to or greater than 7 is two times or more than the content of the acetylenediol having an HLB of less than 4.

Anionic Surfactant

Relatively hydrophobic acetylenediol having a HLB of less than 4 tends to gather in the meniscus with the evaporation of moisture from a nozzle and thus thicken the ink in the vicinity of a nozzle opening. For this reason, the intermittent characteristics of an ink composition containing acetylenediol having a HLB of less than 4 are apt to decrease. However, since the ink composition according to the present embodiment includes an anionic surfactant, it is possible to improve the solubility of acetylenediol having a HLB of less than 4 in water, and thus it is possible to alleviate the increase in the viscosity of ink, thereby exhibiting excellent intermittent characteristics.

The anionic surfactant is not particularly limited, but examples thereof include alkyl sulfocarboxylate, α-olefin sulfonate, polyoxyethylene alkyl ether acetates, N-acylamino acid and salts thereof, N-acylmethyltaurine salt, alkyl sulfate, polyoxyalkyl ether sulfate, polyoxyethylene alkyl ether phosphate, rosin acid soap, castor oil sulfate, lauryl alcohol sulfate, alkylphenol type phosphate ester, alkyl type phosphate ester, alkylaryl sulfonate, diethyl sulfosuccinate, diethyl hexyl sulfosuccinate, and dioctyl sulfosuccinate. Among these, at least one selected from the group consisting of polyoxyethylene compounds and sulfates is preferable. The polyoxyethylene compounds are not particularly limited, but examples thereof include polyoxyethylene alkyl ether acetates, and polyoxyethylene alkyl ether phosphates such as polyoxyethylene lauryl ether phosphate and the like. The sulfates are not particularly limited, but examples thereof include alkyl sulfates such as sodium lauryl sulfate and the like, and polyoxyethylene alkyl ether sulfates. When such anionic surfactant is used, there is a tendency to improve intermittent characteristics. In addition, as the anionic surfactant, an anion type surfactant, which is a resin, may be used. The anionic surfactant may be used alone or in a combination of two or more.

The content of the anionic surfactant is preferably 0.025 mass % to 0.25 mass %, more preferably 0.030 mass % to 0.20 mass %, and still more preferably 0.050 mass % to 0.20 mass %, based on the total amount of the ink composition. When the content of the anionic surfactant is equal to or greater than 0.025 mass %, there is a tendency to further improve intermittent characteristics. In addition, when the content of the anionic surfactant is equal to or less than 0.25 mass %, there is a tendency to further reduce foamability.

The mass ratio of acetylenediol to the anionic surfactant (when the mass of the anionic surfactant is set to 1) is 0.30 to 4.0, preferably 0.50 to 3.5, and more preferably 0.60 to 3.0. When the mass ratio of acetylenediol to the anionic surfactant is equal to or greater than 0.30, cleaning-induced ejection failure can be further suppressed. In addition, when the mass ratio of acetylenediol to the anionic surfactant is equal to or less than 4.0, intermittent characteristics are further improved.

1,2-Alkanediol Having 4 to 6 Carbon Atoms

It is preferred that the ink composition according to the present embodiment further include 1,2-alkanediol having 4 to 6 carbon atoms. When this ink composition further includes 1,2-alkanediol having 4 to 6 carbon atoms, there is a tendency to further improve discharge stability. The 1,2-alkanediol having 4 to 6 carbon atoms is not particularly limited, but examples thereof include 1,2-butanediol, 1,2-pentanediol, and 1,2-hexanediol.

The content of the 1,2-alkanediol having 4 to 6 carbon atoms is preferably 0.50 mass % to 6.0 mass %, more preferably 1.0 mass % to 5.0 mass %, and still more preferably 2.0 mass % to 4.0 mass %, based on the total amount of the ink composition. When the content of the 1,2-alkanediol having 4 to 6 carbon atoms is equal to or greater than 0.50 mass %, there is a tendency to further improve discharge stability. In addition, when the content of the 1,2-alkanediol having 4 to 6 carbon atoms is equal to or less than 6.0 mass %, there is a tendency to further improve setting reliability.

The mass ratio of acetylenediol to the 1,2-alkanediol (when the mass of the 1,2-alkanediol is set to 1) is preferably 0.0010 to 0.100, more preferably 0.0025 to 0.075, and still more preferably 0.0050 to 0.050. When the mass ratio of acetylenediol to the 1,2-alkanediol is equal to or greater than 0.0010, there is a tendency to further improve defoamability. In addition, when the mass ratio of acetylenediol to the 1,2-alkanediol is equal to or less than 0.100, it is possible to secure solubility.

Pyrrolidone Derivative

It is preferred that the ink composition according to the present embodiment further include a pyrrolidone derivative. When this ink composition further includes a pyrrolidone derivative, there is a tendency to further improve intermittent ability. The pyrrolidone derivative is not particularly limited, but examples thereof include 2-pyrrolidone, N-methyl-2-pyrrolidone, and N-ethyl-2-pyrrolidone.

The content of the pyrrolidone derivative is preferably 1.0 mass % to 12 mass %, more preferably 2.0 mass % to 10 mass %, and still more preferably 4.0 mass % to 8.0 mass %, based on the total amount of the ink composition. When the content of the pyrrolidone derivative is equal to or greater than 1.0 mass %, there is a tendency to further improve intermittency. In addition, when the content of the pyrrolidone derivative is equal to or less than 12 mass %, there is a tendency to further improve setting reliability.

Resin

It is preferred that the ink composition according to the present embodiment further include a resin. As the resin, for example, a resin, in which a polymer component is dispersed or dissolved in a solvent in the form of an emulsion, is preferable. Among these, the resin, in which a polymer component is dispersed or dissolved in a solvent in the form of an emulsion, is preferable. When such resin is used, there is a tendency that recorded matter having more excellent water resistance and abrasion resistance is obtained.

The resin is not particularly limited, but examples thereof include an acrylate resin, a vinyl acetate resin, a vinyl chloride resin, a butadiene resin, a styrene resin, a polyester resin, a crosslinked acrylate resin, a crosslinked styrene resin, a benzoguanamine resin, a phenol resin, a silicone resin, an epoxy resin, a urethane resin, a paraffin resin, a fluorocarbon resin, a water-soluble resin, and a copolymer, which is a combination of monomers constituting these resins. The copolymer is not particularly limited, but examples thereof include a styrene-butadiene resin and a styrene-acrylate resin. In addition, as the resin, a polymer latex containing these resins may be used. For example, the polymer latex is a polymer latex containing the microparticles of an acrylate resin, styrene-acrylate resin, styrene resin, crosslinked acrylate resin, and crosslinked styrene resin.

Among these, an acrylate resin, a urethane resin, a polyester resin, a water-soluble resin, and a copolymer, which is a combination of monomers constituting these resins, are preferable. These resins tend to further improve the abrasion resistance of the obtained recorded matter. These resins may be used alone or in a combination of two or more thereof.

The content of the resin is preferably 0.5 mass % to 5.0 mass %, more preferably 0.5 mass % to 4.0 mass %, and still more preferably 0.5 mass % to 3.0 mass %, based on the total amount of the ink composition. When the content of the resin is more than or equal to 0.5 mass %, there is a tendency to further improve the fixing property to media. In addition, when the content of the resin is equal to or less than 5.0 mass %, there is a tendency to further improve setting reliability.

Other Components

In the ink composition according to the present embodiment, in order to favorably maintain the storage stability and the discharge stability from the head, to improve the clogging, and to prevent the deterioration of the ink composition, various additives, such as a dissolution aid, a viscosity modifier, a pH adjuster, an antioxidant, a preservative, an anti-mold agent, a corrosion inhibitor, and a chelating agent for capturing a metal ion that influences dispersion, may be added appropriately.

Dissolved Nitrogen Content

In the content of dissolved nitrogen in an ink composition, generally, with the decrease of the dissolved nitrogen content, the generation of bubbles is suppressed, and cleaning-induced ejection failure is suppressed. However, in order to keep the dissolved nitrogen content of the ink composition at a low level, a degassing mechanism is required in the production step and the storage step. In the ink composition according to the present embodiment, even when the dissolved nitrogen content thereof is set to equal to or greater than 10 ppm or equal to or greater than 15 ppm, bubbles are hardly generated by the defoaming effect of the acetylenediol having a HLB of less than 4, and thus the cleaning-induced ejection failure tends to be suppressed. Meanwhile, the upper limit of the dissolved nitrogen content is not particularly limited, but is preferably equal to or less than 50 ppm, and more preferably equal to or less than 25 ppm. This dissolved nitrogen content may be measured by the methods described in the following Examples.

Ink Composition for Recording Apparatus Having Suction Cap

It is preferable that the ink composition according to the present embodiment be used for a recording apparatus having a suction cap. In the case where a recording apparatus having a suction cap is used, when an ink composition prone to generate bubbles is used, the discharged ink composition is easily accumulated in the suction cap, and particularly, cleaning-induced ejection failure easily occurs. Therefore, the present invention is particularly advantageous. Hereinafter, the suction cap will be described with reference to FIGURE.

FIGURE is a schematic view of a suction cap provided in a recording apparatus. As shown in FIGURE, a round bar-shaped guide shaft 16 is installed in a longitudinal direction. The guide shaft 16 is provided with a carriage 17 which is movably inserted and supported along the longitudinal direction. This carriage 17 is configured to reciprocate in a horizontal direction (main scanning direction X) along the guide shaft 16 by the driving force of a carriage motor (not shown).

Below the carriage 17, a platen 18 is disposed in parallel to the guide shaft 16. The platen 18 is a support base which is disposed to oppose the carriage 17 to support a recording paper P fed from a paper feeding unit. This platen 18 is provided with a paper feeding mechanism (not shown) for feeding the recording paper P in a direction (sub-scanning direction Y) perpendicular to the main scanning direction X.

The carriage 17 is provided with a recording head 19. The recording head 19 is provided with a nozzle formation surface 19a. The nozzle formation surface 19a is provided with a plurality of liquid ejecting nozzles (not shown) for ejecting ink as a liquid.

A suction cap 26 is formed in the shape of an upper side-opening box, and is reciprocally supported along a vertical direction by a lifting mechanism (not shown). The suction cap 26 is provided at the bottom surface thereof with a suction hole 26a penetrating the suction cap 26 in the vertical direction. Further, the suction cap 26 is provided at the inside thereof with a sheet-shaped discharge ink absorber 26b. Furthermore, the suction cap 26 is provided at the upper edge thereof with a rectangular outer frame 26c made of a flexible member.

And, when the recording head 19 moves to an non-printing area and the suction cap 26 moves upward, the outer frame 26c of the suction cap 26 comes in contact with the recording head 19 I to seal the nozzle formation surface 19a. Thus, a space sealing the nozzle formation surface 19a, that is, a cap space is formed in the suction cap 26.

The suction hole 26a formed at the bottom of the suction cap 26 is connected to a discharge tube 27. The discharge tube 27 is a flow channel for air or ink, and is configured to allow the communication between an ink recovery unit 30 and the cap space through a suction pump 28. This suction pump 28 is a pump that is operated by a pump motor (not shown). When the suction pump 28 operates, the gas in the cap space is sucked, a negative pressure corresponding to the suction capacity of the suction pump 28 is formed. By this negative pressure, the thickened ink or the like in the recording head 19 is ejected from the liquid ejecting nozzles toward the cap space (discharge ink absorber 26b). This ejected ink or the like is discharged to the ink recovery unit 30 together with the gas in the cap space through the suction pump 28 and the discharge tube 27.

As such, in this cleaning mechanism 25, By setting the inside of the suction cap 26 to the negative pressure, the thickened ink or the like is ejected from the liquid ejecting nozzles, thus cleaning the inside of the recording head 19. Simultaneously, in this cleaning mechanism 25, the ejected ink or the like is sucked in the suction pump 28, and is thus discharged to the ink recovery unit 30.

Ink Set

The ink set according to the present embodiment includes: the above-described ink composition (hereinafter, referred to as "self-dispersing black ink") containing self-dispersing carbon black; and a color ink. Since carbon black contained in the self-dispersing black ink tends to easily contain nitrogen and easily increase the dissolved nitrogen content causing cleaning-induced discharge failure, the invention is particularly advantageous. Generally, in terms of suppressing the bleeding of black ink into color ink on recorded matter, it is preferred that the wettability of black ink be low, that is, the content of a surfactant be small. Even in this regard, it is preferred that the ink composition of the present embodiment, which can suppress cleaning-induced ejection failure and improve intermittent characteristics by containing a relative small amount of an anionic surfactant, be used as black ink.

The "color ink" is not particularly limited if it is an ink composition containing a color pigment, and commonly known color inks may be used. The color ink may contain acetylenediol have a HLB of less than 4. The surfactant contained in the color ink is not particularly limited, but examples thereof include a silicone-based surfactant and a fluorine-based surfactant.

The method of manufacturing a self-dispersing black ink is not particularly limited, but, for example, there is a method of mixing water with ingredients other than a pigment, a resin and acetylenediol and then additionally mixing this obtained mixture with a pigment, a resin and acetylenediol.

Black Ink Set

The black ink set according to the present embodiment includes: a self-dispersing black ink, which is the above-described ink composition; and a resin-dispersing black ink containing resin-dispersing carbon black and acetylenediol having a HLB of less than 4. Here, the content of acetylenediol contained in the resin-dispersing black ink is less than the content of the acetylenediol contained in the self-dispersing black ink, and the content of the resin-dispersing carbon black is less than or equal to 3.0 mass %.

The black ink set including the self-dispersion black ink and the resin-dispersing black ink has the following effects. First, the self-dispersing black ink can provide higher black density to matte paper. This is because a small amount of resin exists between carbon particles and this is finely fixed on matte paper. Meanwhile, the resin-dispersing black ink can provide high black density and high glossiness to glossy paper. This is because the dispersed resin swollen with an organic solvent such as 1,2-hexanediol smoothly covers the surface of fixed pigment, and thus gloss appears. By the above effects, if the black ink set of the present embodiment is used, it is possible to obtain a high-quality recorded matter for extensive recording media.

The resin-dispersing carbon black and acetylenediol having a HLB of less than 4 contained in the resin-dispersing black ink are the same as above.

The content of the acetylenediol having a HLB of less than 4 contained in the resin-dispersing black ink is less than the content of the acetylenediol having a HLB of less than 4 contained in the self-dispersing black ink. Specifically, the content of the acetylenediol having a HLB of less than 4 contained in the resin-dispersing black ink is preferably 0.0015 mass % to 0.0075 mass %, more preferably 0.0020 mass % to 0.0070 mass %, and still more preferably 0.0025 mass % to 0.0065 mass %. When the content of the acetylenediol having a HLB of less than 4 contained in the resin-dispersing black ink is less than the content of the acetylenediol having a HLB of less than 4 contained in the self-dispersing black ink, there are following effects. Since the resin-dispersing black ink tends to contain a relatively small amount of pigment, to be different from the self-dispersing black ink and to have a small dissolved nitrogen content, the acetylenediol having a HLB of less than 4 may be contained in a small amount. In addition, since this acetylenediol has strong hydrophobicity, there are risks of separating it from a liquid medium and it attacking resin (dispersant), it is preferred that its content be small.

The content of the resin-dispersing carbon black is preferably equal to or less than 3.0 mass %, and more preferably equal to or less than 2.75 mass %, based on the total amount of the resin-dispersing black ink. The lower limit of the content of the resin-dispersing carbon black is not particularly limited, but is preferably equal to or greater than 0.50 mass %. When the content of the resin-dispersing carbon black is equal to or less than 3.0 mass %, there is a tendency to further improve setting reliability.

Recording Apparatus

The recording apparatus according to the present embodiment of the invention is an apparatus for recording an image using the above-described ink composition or ink set. The recording apparatus according to the present embodiment includes a suction cap, and it is preferable that this suction cap be used in the above-described ink composition or cleaning.

The printing methods of the recording apparatus include various printing methods, such as offset printing, flexographic printing, gravure printing, ink jet printing, and the like. Among these, an ink jet recording apparatus using an ink jet printing method is preferable. As the ejecting method of ink jet ink, commonly known ejecting methods may be used, and, particularly, when a method of ejecting liquid droplets using the vibration of a piezoelectric element (a recording method using an ink jet head that forms ink droplets by the mechanical deformation of an electrostrictive element) is used, it is possible to perform an excellent image recording.

EXAMPLES

Hereinafter, the invention will be described in more detail with reference to the following Examples and Comparative Examples. The invention is not limited to these Examples.
Materials for Ink Composition
Main materials of the ink composition used in the following Examples and Comparative Examples are as follows.
Pigment
Self-dispersing carbon black
Resin-dispersing carbon black
Resin-dispersing PB 15:3
Resin-dispersing PY74
Resin-dispersing PV19
Solvent
Glycerin
2-pyrrolidone
1,2-hexanediol
Dipropylene glycol
Acetylenediol derivative
Olfine E1010 (HLB=13, manufactured by Nissin Chemical Industry Co., Ltd.)
Acetylenediol
Compound A (2,5,8,11-tetramethyl-6-dodecyne-5,8-diol, HLB=3)
Silicone-based surfactant
BYK348 (manufactured by BASF Corporation)
Anionic surfactant
Polyoxyethylene oleyl ether sodium sulfate (product name: LATEMUL WX, manufactured by Kao Chemicals Co., Ltd.)
Sodium lauryl sulfate (product name: EMAL 10G, manufactured by Kao Chemicals Co., Ltd.)
Polyoxyethylene lauryl ether phosphate (product name: MP-2H, manufactured by Miyoshi oil & fat Co., Ltd.)
Resin
Urethane resin emulsion
Preparation of ink composition
The above materials were respectively mixed at the composition ratios shown in Tables 1 and 2 below, and sufficiently stirred to obtain to each ink composition. In Tables 1 and 2 below, the unit of each numerical value is mass %, and the total thereof is 100.0 mass %.
Measurement Method of Dissolved Nitrogen Content
The dissolved nitrogen content of each ink was measured by mass conversion using gas chromatography 6890N (trade name, manufactured by Agilent Technologies Corporation).
Surface Tension
The surface tension of each ink composition was measured at a liquid temperature of 25° C. by the Wilhelmy method using a surface tension meter (trade name: CBVP-Z, manufactured by Kyowa Interface Science Co., Ltd.). Unit of surface tension is "mN/m".
Cleaning-Induced Ejection Failure Evaluation Test
PX-G930 (manufactured by Seiko Epson Corporation) was filled with each ink composition, and cleaning was carried out using a suction pump. Thereafter, the ink composition was ejected onto a recording medium (product name: Superfine, manufactured by Seiko Epson Corporation) to form a nozzle check pattern. The obtained nozzle check pattern was visually observed to confirm the number of nozzles that are not correctly landed, such as missing nozzles, bent nozzle, and the like. Cleaning-induced ejection failure was evaluated by the ratio (induction rate) of the number of nozzles that are not correctly landed, such as missing nozzles, bent nozzle, and the like to the total number of nozzles, based on the following evaluation criteria.
Evaluation Criteria
A: Induction rate is less than 20%.
B: Induction rate is equal to or greater than 20% and less than 40%.
C: Induction rate is equal to or greater than 40%. Induction rate: the ratio (failure of cleaning) of observed missing nozzle and bent nozzles in the nozzle check pattern after cleaning.
Intermittent Characteristics Evaluation Test
The obtained ink composition was charged in a head of an ink jet printer PX-H6000. Thereafter, a nozzle check pattern was printed to confirm the fact that there is no filling defect and nozzle clogging. Thereafter, the ink composition was ejected onto a recording medium (product name: Superfine, manufactured by Seiko Epson Corporation) to form a ruled line pattern. Thereafter, the ejection operation was stopped for 4 seconds, and then the ink composition was ejected onto the recording medium (product name: Superfine, manufactured by Seiko Epson Corporation) again to form a ruled line pattern. Intermittent characteristics were evaluated by comparing the landing positions of the ink composition before and after the stopping of the ejection operation, based on the following evaluation criteria.
Evaluation Criteria
A: Ink landing position deviation is within 10 μm.
B: Ink landing position deviation is greater than 10 μm and equal to or less than 40 μm.
C: Ink landing position deviation is greater than 40 μm and equal to or less than 150 μm.
D: Ink landing position deviation is greater than 150 μm, or ink is not ejected.

TABLE 1

| | | Examples | | | | | | |
|---|---|---|---|---|---|---|---|---|
| | | 1 | 2 | 3 | 4 | 5 | 6 | 7 |
| Pigment | Self-dispersing carbon black | 6% | 6% | 6% | 6% | 6% | 6% | 6% |
| Solvent | Glycerin | 10% | 10% | 10% | 10% | 10% | 10% | 10% |
| | 2-pyrrolidone | 6% | 6% | 6% | 6% | 6% | 6% | 6% |
| | 1,2-hexanediol | 3% | 3% | 3% | 3% | 3% | 3% | 3% |
| | Dipropylene glycol | 0.03% | 0.03% | 0.24% | 0.13% | 0.13% | 0.13% | 0.13% |
| Acetylenediol derivative | Olfine E1010 (HLB = 13) | 0.50% | 0.50% | 0.50% | 0.50% | 0.50% | 0.50% | 0.50% |
| Acetylenediol | Compound A (HLB = 13) | 0.017% | 0.017% | 0.10% | 0.08% | 0.08% | 0.13% | 0.13% |

TABLE 1-continued

| | | | | | | | | |
|---|---|---|---|---|---|---|---|---|
| Anionic surfactant | Polyoxyethylene oleyl ether sodium sulfate | 0.025% | 0.05% | 0.03% | 0.10% | 0.25% | 0.05% | 0.25% |
| | Sodium lauryl sulfate | — | — | — | — | — | — | — |
| | Polyoxyethylene lauryl ether phosphate | — | — | — | — | — | — | — |
| Resin | Urethane resin emulsion | 1.00% | 1.00% | 1.00% | 1.00% | 1.00% | 1.00% | 1.00% |
| | Pure water | balance | balance | balance | balance | balance | balance | balance |
| Ratio (acetylenediol/anionic surfactant) | | 0.67 | 0.33 | 3.33 | 0.83 | 0.33 | 2.67 | 0.53 |
| Ratio (acetylenediol/1,2-alkanediol) | | 0.0056 | 0.0056 | 0.0333 | 0.0278 | 0.0278 | 0.0444 | 0.0444 |
| Dissolved nitrogen content (ppm) | | 20 | 20 | 20 | 20 | 20 | 20 | 20 |
| Cleaning induction | | B | B | A | A | A | B | B |
| Intermittent ability | | B | B | B | A | B | B | B |

| | | Examples | | Comparative Examples | | | | |
|---|---|---|---|---|---|---|---|---|
| | | 8 | 9 | 1 | 2 | 3 | 4 | 5 |
| Pigment | Self-dispersing carbon black | 6% | 6% | 6% | 6% | 6% | 6% | 6% |
| Solvent | Glycerin | 10% | 10% | 10% | 10% | 10% | 10% | 10% |
| | 2-pyrrolidone | 6% | 6% | 6% | 6% | 6% | 6% | 6% |
| | 1,2-hexanediol | 3% | 3% | 3% | 3% | 3% | 3% | 3% |
| | Dipropylene glycol | 0.13% | 0.13% | 0.00% | 0.09% | 0.13% | 0.13% | 0.18% |
| Acetylenediol derivative | Olfine E1010 (HLB = 13) | 0.50% | 0.50% | 0.50% | 0.50% | 0.50% | 0.50% | 0.50% |
| Acetylenediol | Compound A (HLB = 13) | 0.08% | 0.08% | — | 0.05% | 0.08% | 0.08% | 0.12% |
| Anionic surfactant | Polyoxyethylene oleyl ether sodium sulfate | — | — | 0.10% | 0.20% | — | 0.30% | 0.03% |
| | Sodium lauryl sulfate | 0.10% | — | — | — | — | — | — |
| | Polyoxyethylene lauryl ether phosphate | — | 0.10% | — | — | — | — | — |
| Resin | Urethane resin emulsion | 1.00% | 1.00% | 1.00% | 1.00% | 1.00% | 1.00% | 1.00% |
| | Pure water | balance | balance | balance | balance | balance | balance | balance |
| Ratio (acetylenediol/anionic surfactant) | | 0.83 | 0.83 | 0. | 0.25 | — | 0.27 | 4.8 |
| Ratio (acetylenediol/1,2-alkanediol) | | 0.0278 | 0.0278 | — | 0.0167 | 0.0267 | 0.0267 | 0.0400 |
| Dissolved nitrogen content (ppm) | | 20 | 20 | 20 | 20 | 20 | 20 | 20 |
| Cleaning induction | | A | A | C | B | A | A | A |
| Intermittent ability | | A | A | B | C | C | C | C |

TABLE 2

| | | Bk1 | Bk2 | C | Y | M |
|---|---|---|---|---|---|---|
| Pigment | Self-dispersing carbon black | 6% | — | — | — | — |
| | Resin-dispersing carbon black | — | 2.1% | — | — | — |
| | Resin-dispersing PB 15:3 | — | 0.4% | 5% | — | — |
| | Resin-dispersing PY74 | — | — | — | 4.0% | — |
| | Resin-dispersing PV19 | — | — | — | — | 5.0% |
| Solvent | Glycerin | 10% | 10% | 10% | 10% | 10% |
| | 2-pyrrolidone | 6% | 6% | 6% | 6% | 6% |
| | 1,2-hexanediol | 3% | 3% | 3% | 3% | 3% |
| | Dipropylene glycol | 0.13% | 0.02% | 0.01% | 0.01% | 0.01% |
| Acetylenediol derivative | Olfine E1010 (HLB = 13) | 0.50% | — | — | — | — |
| Acetylenediol | Compound A (HLB = 13) | 0.08% | 0.01% | 0.02% | 0.01% | 0.01% |
| Silicone-based surfactant | BYK 348 | — | 0.30% | 0.30% | 0.80% | 0.80% |

TABLE 2-continued

|  |  | Bk1 | Bk2 | C | Y | M |
|---|---|---|---|---|---|---|
| Anionic surfactant | Polyoxyethylene oleyl ether sodium sulfate | 0.10% | — | — | — | — |
| Resin | Urethane resin | 1.00% | 1.00% | 1.00% | 1.00% | 1.00% |
|  | Pure water | balance | balance | balance | balance | balance |
|  | Dissolved nitrogen content (ppm) | 20.0 ± 2.0 | 14.0 ± 2.0 | 10.0 ± 2.0 | 10.0 ± 2.0 | 10.0 ± 2.0 |
|  | Surface tension | 29 | 26 | 28 | 25 | 25 |
|  | Ratio (acetylenediol/anionic surfactant) | 0.80 | — | — | — | — |
|  | Ratio (acetylenediol/1,2-alkanediol) | 0.0267 | 0.0017 | 0.0033 | 0.0033 | 0.0033 |

Ink sets including Bk1 and Bk2, Bk1 and C, Bk1 and Y, and Bk1 and M, shown in Table 2, respectively, were prepared. The obtained ink set was set to an ink jet printer PX-H6000. Thereafter, a nozzle check pattern was printed to confirm the fact that there is no filling defect and nozzle clogging. Thereafter, the ink composition was ejected onto a recording medium. In the case of the black ink set including Bk1 and Bk2, In the case of the black ink set comprising Bk1 and Bk2, as the recording medium, matte paper (product name: Superfine, manufactured by Seiko Epson Corporation) or glossy paper (product name: Photo Paper "Glossy", manufactured by Seiko Epson Corporation,) was used. Further, in the case of the ink sets including Bk1 and C, Bk1 and Y, and Bk1 and M, respectively, as the recording medium, matte paper (product name: Superfine, manufactured by Seiko Epson Corporation) was used. Moreover, in the case of the ink sets including Bk1 and C, Bk1 and Y, and Bk1 and M, respectively, recording was conducted such that the boundary line of the solid pattern of Bk1 is in contact with the boundary line of the solid pattern of C, Y, or M.

By using the black ink set including Bk1 and Bk2, when matte paper is used as the recording medium, recorded matter having higher black density can be obtained, and when glossy paper is used as the recording medium, recorded matter having higher black density and higher glossiness can be obtained.

In addition, by using the ink sets including Bk1 and C, Bk1 and Y, and Bk1 and M, respectively, cleaning-induced ejection failure can be suppressed and intermittent characteristics can be improved, and simultaneously the bleeding of black ink into color ink on recorded matter can be suppressed.

The entire disclosure of Japanese Patent Application No. 2014-030361, filed Feb. 20, 2014 is expressly incorporated by reference herein.

What is claimed is:

1. An ink composition configured for use in an ink jet recording apparatus having a nozzle for ejecting the ink composition and a suction cap that seals the nozzle, the suction cap defining a cap space that includes an ink absorber therein, and the cap space is configured to be evacuated when the suction cap seals the nozzle, the ink composition comprising:
   a pigment, a content of the pigment being equal to or greater than 5.0 mass %;
   acetylenediol having an HLB of less than 4, a content of the acetylenediol being 0.010 mass % to 0.40 mass %;
   a 1,2-alkanediol having 4 to 6 carbon atoms, a content of the 1,2-alkanediol having 4 to 6 carbon atoms being 0.50 mass % to 6.0 mass %; and
   an anionic surfactant, a content of the anionic surfactant being 0.025 mass % to 0.25 mass %,
   wherein a mass ratio of the acetylenediol to the anionic surfactant is 0.30 to 4.0,
   a mass ratio of the acetylenediol to the 1,2-alkanediol is 0.0010 to 0.100, and
   wherein during evacuation of the suction cap when the suction cap seals the nozzle, the acetylenediol having the HLB of less than 4 reduces the formation of bubbles in the ink composition that collect on the ink absorber.

2. The ink composition according to claim 1, wherein the acetylenediol includes 2,5,8,11-tetramethyl-6-dodecyne-5,8-diol.

3. An ink jet recording apparatus, comprising:
   the ink composition according to claim 2;
   a nozzle for ejecting the ink composition; and
   a suction cap that seals the nozzle,
   the suction cap defining a cap space that includes an ink absorber therein, and the cap space configured to be evacuated when the suction cap seals the nozzle.

4. The ink composition according to claim 1, wherein the anionic surfactant contains at least one selected from the group consisting of polyoxyethylene-based compounds and sulfates.

5. An ink jet recording apparatus, comprising:
   the ink composition according to claim 4;
   a nozzle for ejecting the ink composition; and
   a suction cap that seals the nozzle,
   the suction cap defining a cap space that includes an ink absorber therein, and the cap space configured to be evacuated when the suction cap seals the nozzle.

6. The ink composition according to claim 1, wherein the content of the pigment is 5.0 mass % to 10 mass %.

7. The ink composition according to claim 1, further comprising an acetylenediol derivative having an HLB of equal to or greater than 7.

8. The ink composition according to claim 7, wherein the acetylenediol derivative having an HLB of equal to or greater than 7 is selected from the group consisting of an alkylene oxide adduct of 2,5,8,11-tetramethyl-6-decyne-5,8-diol, 2,4-dimethyl-5-decyne-4-ol, and an alkylene oxide adduct of 2,4-dimethyl-5-decyne-4-ol.

9. The ink composition according to claim 1, further comprising a pyrrolidone derivative, a content of the pyrrolidone derivative being 1.0 mass % to 12 mass %.

10. The ink composition according to claim 1, having a dissolved nitrogen content of equal to or greater than 10 ppm.

11. The ink composition according to claim 1, wherein the pigment contains self-dispersing carbon black.

12. An ink set, comprising:
a self-dispersing black ink, which is the ink composition according to claim 11; and
a color ink.

13. A black ink set, comprising:
a self-dispersing black ink, which is the ink composition according to claim 11; and
a resin-dispersing black ink containing resin-dispersing carbon black and acetylenediol having an HLB of less than 4,
wherein the content of the acetylenediol contained in the resin-dispersing black ink is lower than the content of the acetylenediol contained in the self-dispersing black ink, and
wherein the content of the resin-dispersing carbon black is equal to or less than 3.0 mass %.

14. An ink jet recording apparatus, comprising:
the ink composition according to claim 1;
a nozzle for ejecting the ink composition; and
a suction cap that seals the nozzle,
the suction cap defining a cap space that includes an ink absorber therein, and the cap space configured to be evacuated when the suction cap seals the nozzle.

\* \* \* \* \*